Figure 1:
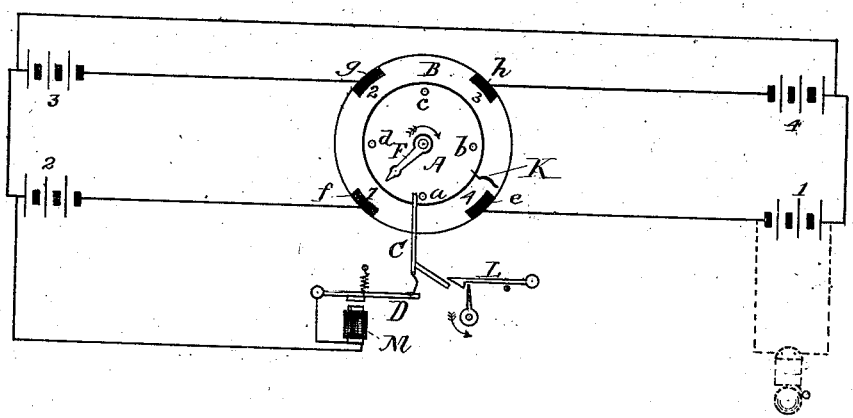

(No Model.)  
3 Sheets—Sheet 1.

G. F. MILLIKEN.
APPARATUS FOR AUTOMATICALLY TESTING ELECTRICAL CIRCUITS.

No. 334,969.  
Patented Jan. 26, 1886.

WITNESSES.  
J. Henry Taylor  
E. B. Tomlinson.

INVENTOR.  
Geo. F. Milliken  
by Alex. P. Browne,  
attorney (No Model.)

G. F. MILLIKEN.

3 Sheets—Sheet 2.

APPARATUS FOR AUTOMATICALLY TESTING ELECTRICAL CIRCUITS.

No. 334,969. Patented Jan. 26, 1886.

WITNESSES.

INVENTOR.

(No Model.)

G. F. MILLIKEN.
APPARATUS FOR AUTOMATICALLY TESTING ELECTRICAL CIRCUITS.

No. 334,969. Patented Jan. 26, 1886.

3 Sheets—Sheet 3.

WITNESSES.
J. Henry Taylor.
E. B. Tomlinson.

INVENTOR
Geo. F. Milliken
by Alex. P. Browne,
attorney

UNITED STATES PATENT OFFICE.

GEORGE F. MILLIKEN, OF BOSTON, MASSACHUSETTS.

APPARATUS FOR AUTOMATICALLY TESTING ELECTRICAL CIRCUITS.

SPECIFICATION forming part of Letters Patent No. 334,969, dated January 26, 1886.

Application filed May 16, 1885. Serial No. 165,692. (No model.)

*To all whom it may concern:*

Be it known that I, GEORGE F. MILLIKEN, of Boston, in the county of Suffolk and State of Massachusetts, a citizen of the United States, am the inventor of a certain new and useful apparatus for use in connection with electrical circuits, and intended and adapted automatically to test the said circuits and to discover and signify defects, whether of the battery or the line existing therein.

This apparatus may be briefly styled an "automatic fault-detector and alarm."

The object of my invention is to provide an apparatus which shall automatically test the condition of an electrical circuit or circuits at any predetermined time or any predetermined number of times, and automatically signal the existence of faults existing therein.

There are many defects that may occur in electrical circuits while in use for any of the purposes to which such circuits are ordinarily applied, which it is important to detect and remedy before they shall have seriously impaired the efficiency of the circuit for ordinary service. Such a defect, for example, is the weakening of the battery in electrical circuits used for operating annunciators or call-bells in which open-circuit batteries of the Leclanché type are commonly employed. In such circuits the running down of the battery is a defect which it is important to discover and correct before the battery gets so weak that it will fail to do the work required.

Upon another class of circuits—as, for example, the metallic circuits used in telephony and in the district-messenger service—the presence of a ground on the line, although not necessarily in itself a detriment to the operation of the circuit, is dangerous to the extent that in case of a second ground on another part of the line the apparatus of subscribers located between the two grounds is rendered useless. It is therefore necessary to test the circuits frequently for grounds, which requires a considerable amount of time and labor, and also interferes to a material extent with the operative effectiveness of the line during the testing. Furthermore, a break in a normally-open circuit is an important defect, and one which my invention is also able to detect and signal.

By my present invention I have supplied a device whereby an electrical circuit or circuits may be automatically and regularly tested as frequently as may be required without in any appreciable degree interfering with their use, and the presence of faults thereon is reported at a central station or other convenient point, and made known to the person in charge.

The underlying features of the apparatus are a battery or other source of electricity, an electro-magnet with spring-sustained armature and armature-lever of ordinary construction, a moving part, preferably driven by clock-work or other regular motor, an arm normally extending across the path of the moving part, but so controlled by the motion of the armature-lever as to be drawn out of the path of the moving part when the electro-magnet is energized and its armature drawn down, and also made flexible or resilient, so as to yield and allow the moving part to pass by it, and an alarm, either visible or audible, and electrical or mechanical, so arranged as to give a signal either when the arm is bent or when it is drawn down to a certain point. In addition, there are provided two contact-pieces, either or both movable, so arranged as to come together when the moving part is pressing against the flexible arm, and thereby and at that time bring the electro-magnet under the influence of its energizing-battery. All these features of my device are the same, regardless of the special character of the defect that it is to report; but certain slight modifications in its arrangement, attachments, and connections are called for to adapt it to the detection of any particular fault—as, for example, a weak battery, a ground, or a break. I will therefore illustrate and describe the device as preferably arranged, and operating, first, for the detection and report of a weak battery; secondly, for the detection and report of a ground upon a metallic closed circuit; and, third, for the detection of a break. When the nature and operation of the apparatus in these connections are thus made clear, it will be easy for any competent electrician to apply the apparatus for other uses of the same character.

Figure 2:
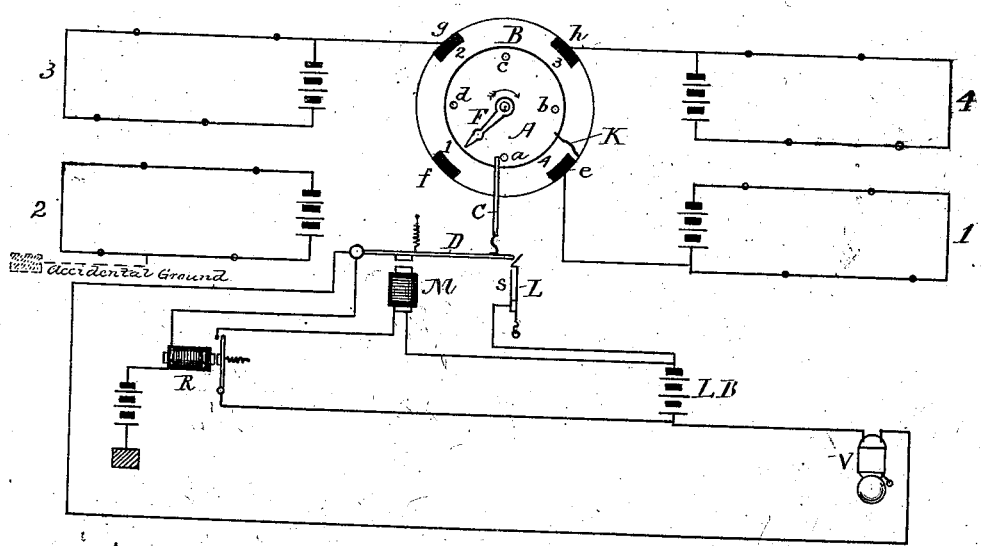
Figure 3:
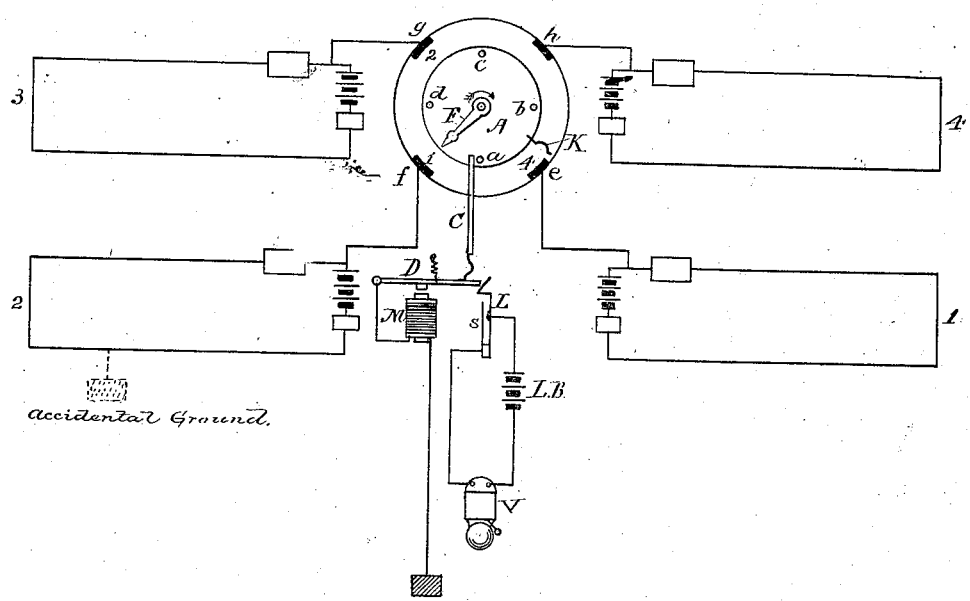
Figure 4:
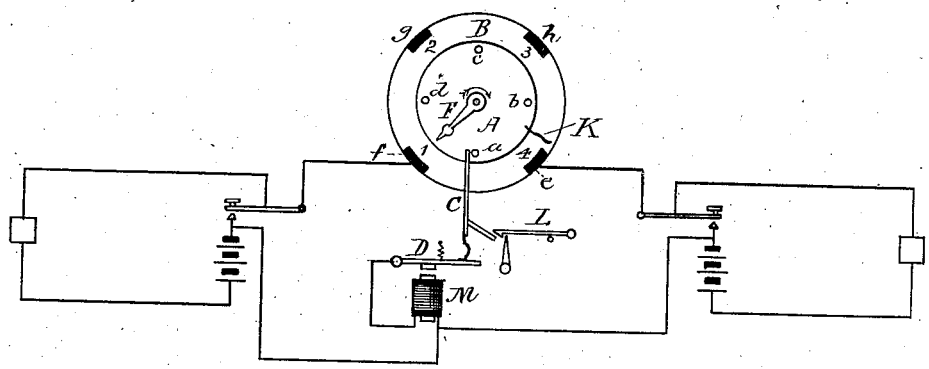
Figure 5:
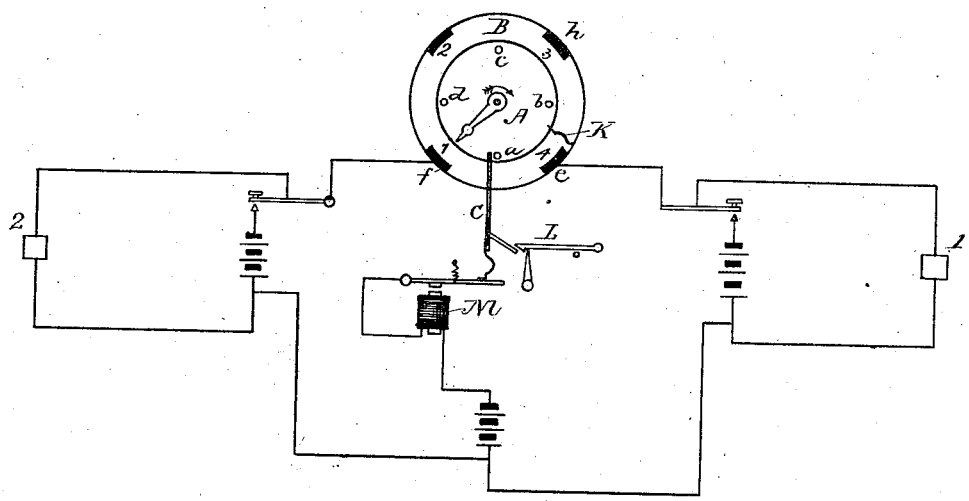

Figure 1 shows in diagram the construction of the apparatus and its preferred arrangement for detecting and signaling a weak battery; Figs. 2 and 3, in the same manner, two ways of arranging it to detect and signal grounds on a district-messenger circuit, first, by using a special testing-battery, and, second, by using the working-battery for this purpose. Figs. 4 and 5 show the same variations of the mode of applying the device to testing and signaling breaks in a circuit or circuits normally open.

In Fig. 1 I have illustrated the application, in the form now best known to me, of a device embodying my invention to four circuits—such as are ordinarily used for vibrating bells, annunciators, telephone-transmitters, &c. Each of these circuits has its battery presumably of the Leclanché type. The drawings indicate only one of these working-circuits—that operated by battery No. 1—but the batteries of all and the extra connections involved in the operation of the apparatus in the form shown.

In the drawings, A represents a dial of metal driven by clock-work, and carrying four metal pins, $a\ b\ c\ d$, corresponding to the four circuits indicated.

B represents a stationary figured and non-metallic rim upon which, for convenience, are set and insulated at equal intervals four contacts or terminals, $e\ f\ g\ h$, for the four circuits.

C represents a flexible resilient metallic arm mounted upon and electrically connected with an armature-lever, D.

M is an electro-magnet, of which D is the armature, and L represents a stop or detent controlling an alarm, but adapted to be released by the extreme movement of the arm C, as will be hereinafter explained.

The circuits shown are those employed simply in connection with the apparatus itself, each battery being supposed to be also connected with its own working circuit or circuits for service in the ordinary manner.

The principal object of the arrangement shown in Fig. 1 being to test and report the condition of the batteries, no necessity exists for the use of an extra battery, the power of each battery in succession being employed to work the apparatus which tests it. Thus each battery forms in turn a part of the testing apparatus.

The operation of the apparatus is as follows: Let it be assumed that the apparatus is required to make a test of all the batteries every hour. In that case the dial A is arranged to make a complete revolution once in that time. Now, assume the apparatus to be in the position shown in the drawings—viz., about to test battery No. 1. The onward motion of the pin $a$ will bring it against the arm C and crowd it to one side. The further motion of the dial brings the moving contact K into electrical connection with the terminal $e$ of the connection leading to battery No. 1, thereby establishing an electrical circuit, which, starting at K, is through the contact to battery No. 1, thence through the outside connection, as shown, to the magnet M, armature D, arm C, pin $a$, dial A, and back to contact K. The armature-lever D being held up by an adjustable spring set at a standard tension, the battery-strength of battery No. 1, if normal, will, when the circuit is thus closed, excite the magnet M sufficiently to draw down the armature-lever D, thereby instantly withdrawing the arm C from in front of the pin $a$ and breaking the circuit. When this occurs, the arm C returns into its place over the dial, but behind the pin $a$. This operation is insured by the relative location of the pin, contact, and terminal, which compels the arm C being moved far enough to one side before connection is made to insure its going back to the other side of the pin when the circuit is broken. The battery being normal no signal is given.

The next battery in order is No. 2, which it is assumed has run down below the normal strength. When by the motion of the dial the pin $b$ is brought around to and pressed against the arm C, and connection is then made between the contact K and the terminal $f$ of battery No. 2, this battery being too weak to excite the magnet M sufficiently to draw down the armature D, the continued motion of the dial crowds the arm C over until it strikes and releases the detent L, thereby operating the alarm, which may be mechanical or electrical, and visible or audible, as desired. At the same time the pointer F has moved round to and stands opposite the figure 2 upon the rim B, thereby showing to the attendant that battery No. 2 is weaker than the standard, notwithstanding it may still have sufficient strength to perform the ordinary service to which it is applied.

If only one battery is to be tested, the trailing contact K may obviously be dispensed with, and in its stead a contact may be arranged upon the arm C, or elsewhere, as may be convenient, but in such a position that it will be brought into connection with the terminal of the line from the single battery to be tested after the arm C has been crowded over sufficiently far by the forward movement of the pin.

It is obvious that the closing of the circuit described being merely for an instant, no detriment can result, either to the battery or to the service to be performed in the circuit which it is employed for working. It is also obvious that when it is desired to use an electrical alarm, instead of the mechanical one indicated in the drawings, this may be done by so arranging the arm C that its motion, instead of tripping a detent, will close a circuit and ring a bell or work a signal. Again, inasmuch as the reason for making the arm C resilient is twofold—viz., to allow the arm to be moved laterally by the moving-pin, and also to cause the arm to return to its normal position after its release from the pin—a pivotal connection to permit lateral motion, and a weight to cause the arm to return, may be substituted, if desired. Many such modifications of details of construction or arrangement will at once suggest themselves to persons skilled in such apparatus.

In Figs. 2 and 3 I have represented the apparatus as arranged in connection with a given number of metallic circuits, such as are used in telephone and district messenger service. In this case one of the defects to be tested for is the existence of an accidental ground upon the metallic circuit. The methods now in use of finding such a ground are manual and laborious, and cause interruptions to the service and annoyance to subscribers, so that the circuits are not tested as frequently as they otherwise would be. These objections are practically overcome in the use of my apparatus, as herein described and shown. I have also shown in this connection an electrical alarm by which the presence of a ground on the metallic circuit is continuously signaled until the alarm is checked by the operator, while at the same time the main line or the service is not affected.

The construction of the dial, its pins, surrounding disk, the trailing contact, the resilient arm, the armature-lever and its electro-magnet are all as formerly explained. Inasmuch, however, as the function of the apparatus now is to throw a battery-current onto the main line to be tested, a special battery may conveniently be provided. This is illustrated in Fig. 2, where $Ba$ represents this battery. One terminal of this battery goes to ground, the other, as shown, is connected with the coils of a relay-magnet, and thence to the armature-lever D and arm C. The electro-magnet M, which controls this armature-lever D, is for convenience placed in the relay or local circuit, which is provided with its own local battery, (marked LB,) and this circuit is closed by the armature of the relay-magnet, as shown, when the relay-magnet is energized. Assuming the apparatus to be in the position shown, the operation is as follows: Circuit No. 1 is about to be tested, and its corresponding pin, $a$, by the motion of the dial, is pressed against the arm C. Then the further revolution of the dial makes electrical connection between the contact K and the terminal of the line leading to circuit No. 1, and thus the grounded battery $Ba$ is connected to that circuit. There being, however, no ground upon that circuit, the relay-magnet R, and consequently the electro-magnet M, are not energized, and the arm C is simply crowded one side by the pin $a$ until it escapes and passes under and behind it by its own resiliency. The continued revolution of the dial brings the apparatus into position to test circuit No. 2. Upon this circuit there is an accidental ground; therefore, when the pin $b$ has moved round to and pressed against the arm C, and when the contact K has made connection with the terminal $f$, the circuit containing the battery $Ba$ is completed, and thereby the relay-magnet R, and consequently the electro-magnet M in the local circuit, are energized and the armature D drawn down until it engages with the terminal S of the alarm-circuit, and is held in engagement therewith by a detent, L, as shown. This alarm-circuit is through S to the local battery, and thence to the bell V, and thence through the armature-lever D back to S, and being thus completed the bell will ring until the circuit is broken by the operator releasing the detent L. Inasmuch, however, as the act of drawing down the armature D and the arm C broke the circuit of the battery $Ba$ immediately that it was formed, no appreciable detriment has been caused in the working of the circuit in which the fault has been discovered, and, furthermore, the relay-magnet R having thus been demagnetized the electro-magnet M has been demagnetized in its turn, and therefore the armature-lever D is free to go back to its place when the detent is released by the operator. The operation of the index F is the same as before pointed out.

It is obvious that a considerable number of circuits may be tested in a single revolution of the dial A, corresponding to the number of insulated terminals that may be put upon the rim B, and that either in this case or in the one first described the successive testing may, if occasion require, be done by rotating the dial by hand. This is often an advantage when, for any reason, it becomes desirable to make a test of any circuit or circuits in advance of the time at which they would be reached by the apparatus if worked by the clock-movement in the ordinary and normal manner. It is also obvious that while the placing of the electro-magnet M in a relay-circuit is desirable, it would be possible, although generally disadvantageous, to put it directly into connection with the grounded battery $Ba$ and energize it directly therefrom. The bell-circuit may, moreover, be entirely independent of the armature-lever, which could be arranged to close it by pressing the spring S against a contact forming the other terminal of a bell-circuit, as shown in Fig. 3; or a mechanical alarm might be substituted.

In Fig. 3 I have illustrated a variation in the arrangement of the apparatus when used for testing metallic circuits for grounds, whereby the line-battery is made use of for testing, and special battery for this purpose is dispensed with. The wires leading to the contacts $e$, $f$, $g$, and $h$ are connected with the circuits to be tested at a point between the receiving electro-magnet and the battery of those circuits. It is obvious that if there be no accidental ground on the line the current from the battery will have but one path—viz., the metallic circuit. An accidental ground, however, anywhere on the line, as shown in circuit No. 2, forms an additional circuit through the testing apparatus to its ground when the contacts are closed. The current from the battery $Ba$ of circuit No. 2 now divides between these two paths inversely, as their resistances and a proper regulation of the resistances of the two circuits at the testing-station will cause enough current to pass through the magnet M to draw down the armature D. This, when drawn down, will force the spring-contact L, thus closing the local circuit through the local battery L B and alarm-bell V and causing the latter to ring until the attendant releases the armature.

In Figs. 4 and 5 I have shown the same application of the apparatus to testing for breaks in a normally-open circuit, both by the use of the line-battery, and also of a special battery for testing.

Fig. 4 represents the line-battery Ba in use for this purpose. As each circuit comes into electrical connection with the electro-magnet M, if the line is perfect, the current from the battery Ba energizing the magnet M, draws down the armature D and no signal is given. If the line is broken, no current passes through the magnet, and therefore the arm C is pressed over till it trips the latch L and operates the alarm. In Fig. 5 the same arrangement is shown, except that a special testing-battery, Ba, is provided.

It is obvious from the foregoing specification that the electro-magnet may be either in the same circuit as the testing-battery or in a relay-circuit worked thereby; that where a battery forms part of the apparatus to be tested it may itself be used as the testing-battery, if desired; that the alarm may be arranged to be operated either when the electro-magnet draws down the arm C or when it fails to do so, as may be desired, and that no special location or arrangement of the contact-points whereby the electrical connection is made between the electro-magnet and the service to be tested is necessary.

I claim—

1. An automatic device for testing and signaling defects or faults in an electrical circuit, containing the following elements, viz: a battery or other suitable current-generator; an electro-magnet, with its armature-lever and armature; a moving part; an arm normally extending across the path of motion of the moving part, said arm being made flexible or resilient, so as to yield and allow the moving part to pass it, and so connected with the armature-lever that when this is moved by the energized magnet the arm will be clear of the moving parts; an alarm connected with the arm and armature and operated when the former is displaced, and two contact-points so located relatively to the arm and moving part as to come together when the said arm and said moving part are in contact, and thereby establish an electrical connection between the electro-magnet and the circuit or other service to be tested, all as set forth.

2. An automatic device for testing and signaling defects or faults in a series of electrical circuits, said device containing the following elements, viz: a battery or other suitable current-generator; an electro-magnet, with its armature-lever and armature; a series of moving parts or pins preferably carried by clockwork; an arm normally extending across the path of the moving parts or pins, said arm being made flexible or resilient, so as to yield and allow the moving pins to pass it, and also being so connected with the armature-lever that when this is moved by the energized magnet the arm will be clear of the moving pins; a series of fixed contacts, each connected with one of the lines or circuits to be tested; a moving contact-point arranged to make contact successively with each of the said fixed contacts when its corresponding pin is pressing against the said arm, and thereby to establish an electrical connection between the electro-magnet and the circuit or other service to be tested, and an alarm connected with the arm and armature and operated when the former is displaced, all as set forth.

3. In an automatic device for testing and signaling defects or faults in an electrical circuit or circuits, the combination of a testing-battery, Ba, electro-magnet M, armature D, arm C, dial A, carrying pins $a\ b\ c\ d$, moving contact K, fixed contacts $e\ f\ g\ h$, and an alarm, as set forth.

4. In an automatic device for testing and signaling defects or faults in an electrical circuit or circuits, the combination of a testing-battery, Ba, electro-magnet M, armature D, arm C, dial A, carrying pins $a\ b\ c\ d$, and pointer or index F, surrounding rim B, having numbers 1 2 3 4, corresponding to the circuits to be tested, moving contact K, fixed contacts $e\ f\ g\ h$, and an alarm, as set forth.

In testimony whereof I have hereunto subscribed my name this 7th day of May, A. D. 1885.

GEORGE F. MILLIKEN.

Witnesses:
J. HENRY TAYLOR,
E. B. TOMLINSON.